United States Patent [19]

Imamura et al.

[11] Patent Number: 4,603,277

[45] Date of Patent: Jul. 29, 1986

[54] FLUORESCENT LAMP WITH BENT TUBES AND SUPPORT SPACER WITHIN OUTER BULB

[75] Inventors: Hiroshi Imamura, Osaka; Makoto Toho, Hikone, both of Japan

[73] Assignee: Matsushita Electric Works, Ltd., Japan

[21] Appl. No.: 771,185

[22] Filed: Sep. 3, 1985

Related U.S. Application Data

[63] Continuation of Ser. No. 480,092, Mar. 29, 1983, abandoned.

[30] Foreign Application Priority Data

Mar. 31, 1982 [JP] Japan .................................. 57-54292

[51] Int. Cl.⁴ ........................ H01J 61/30; H01J 61/42
[52] U.S. Cl. ...................................... 313/25; 313/493
[58] Field of Search .................. 313/25, 493, 610, 634

[56] References Cited

U.S. PATENT DOCUMENTS

| | | | |
|---|---|---|---|
| 2,788,462 | 4/1957 | MacFarlane | 313/634 X |
| 4,199,708 | 4/1980 | Lauwerijssen et al. | 313/493 |

FOREIGN PATENT DOCUMENTS

| | | | |
|---|---|---|---|
| 44958 | 3/1982 | Japan | 313/493 |
| 374291 | 6/1932 | United Kingdom . | |
| 395738 | 7/1933 | United Kingdom . | |
| 400646 | 10/1933 | United Kingdom . | |
| 405499 | 2/1934 | United Kingdom . | |
| 414608 | 8/1934 | United Kingdom . | |
| 966077 | 8/1964 | United Kingdom . | |
| 2003316 | 3/1979 | United Kingdom . | |

*Primary Examiner*—Palmer C. DeMeo
*Attorney, Agent, or Firm*—Stevens, Davis, Miller & Mosher

[57] ABSTRACT

A high density fluorescent lamp having a plurality of U shaped bent tubes secured to a disc shaped spacer. Passages within the spacer connect to the tubes so as to define a common discharge path which includes the passages. The tubes and spacer are enclosed within an outer bulb.

6 Claims, 7 Drawing Figures

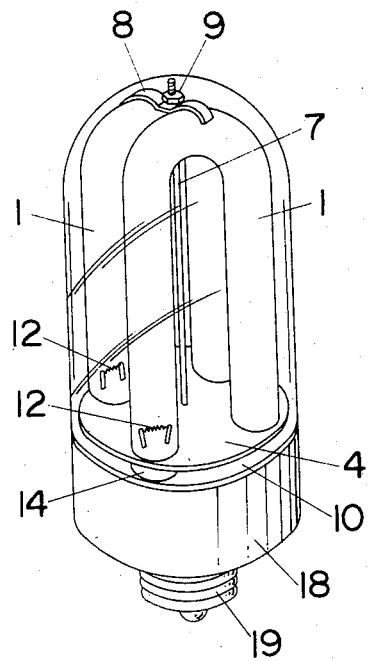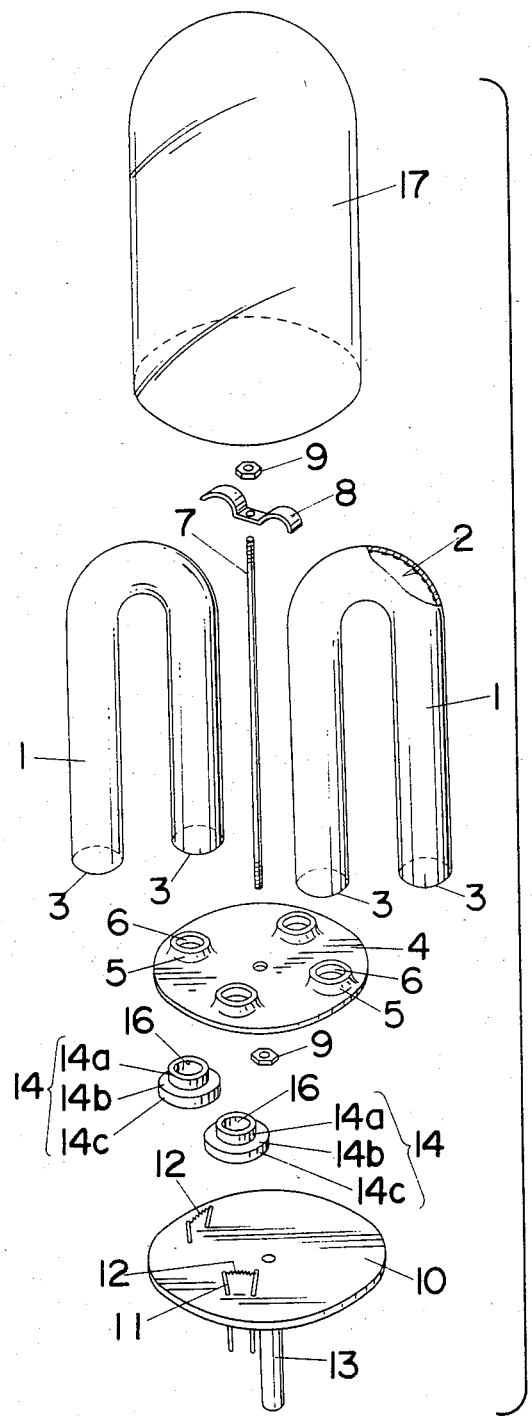

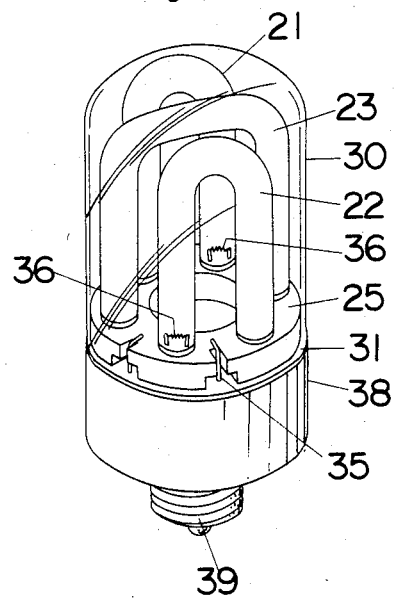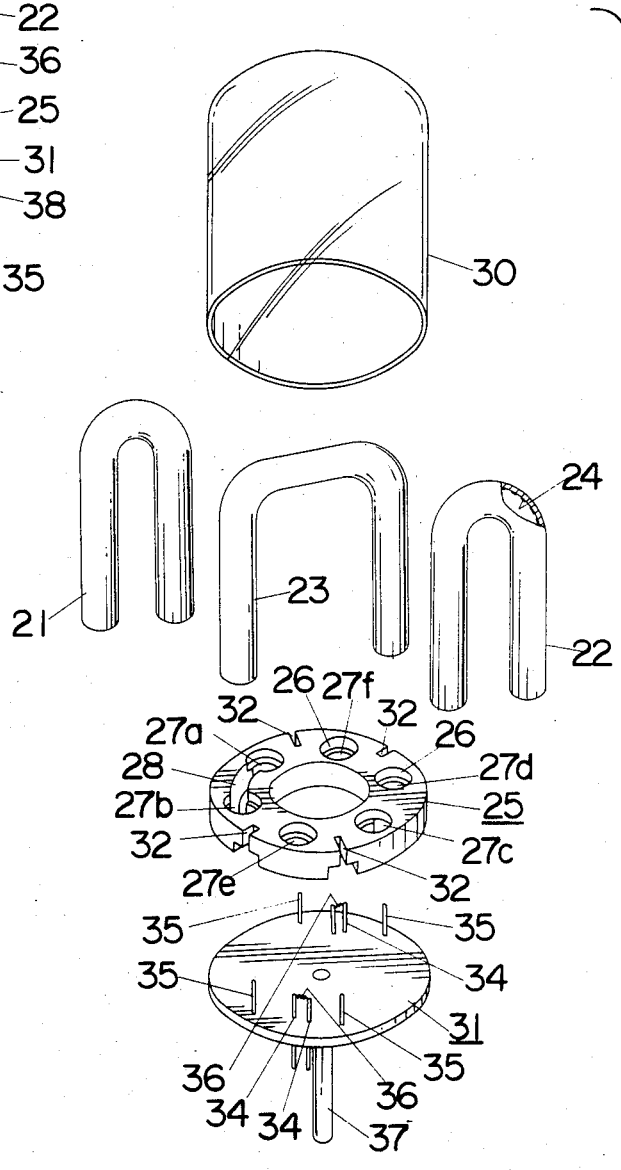

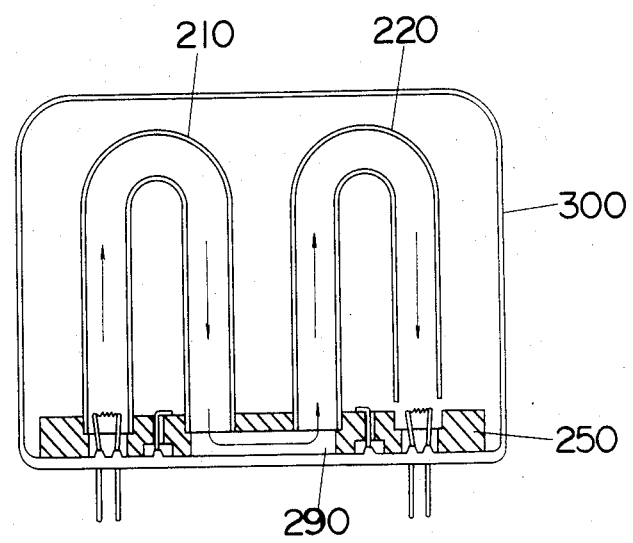

FLUORESCENT LAMP WITH BENT TUBES AND SUPPORT SPACER WITHIN OUTER BULB

This application is a continuation of application Ser. No. 480,092, filed Mar. 29, 1983, and now abandoned.

BRIEF SUMMARY OF THE INVENTION

This invention relates to compact high-density fluorescent lamps. In such lamp there are several problems because users may reasonably expect about three times greater efficiency than with incandescent lamps but not in the same space. That is a 40 W incandescent lamp is 60 mm in outer diameter and about 160 mm in overall length including the lighting unit and base; the same holds true for a usual 60 W incandescent lamp which is 60 mm in outer diameter and about 200 mm in overall length. On the other hand a compact fluorescent lamp is greater in length than an incandescent lamp, being about 100 to 110 mm in overall length. Thus such fluorescent lamps have not been considered to inevitably replace conventional incandescent lamps. Also, it has been difficult to control the concentrated distribution of light such as point-source light, eminating from an incandescent lamp, because the above-mentioned greater length of a fluorescent lamp enlarges the luminous area thus rendering it a diffused light source.

This invention has been designed to eliminate the above defects. An object of the invention is to provide a high-density fluorescent lamp which is so constructed that the discharge path, comprising a plurality of bent inner tubes, is made longer even in a restricted space within an outer bulb with the result that the lamp can be of compact size and of high efficiency.

Another object of the invention is to provide a high-density fluorescent lamp simple to assemble and inexpensive to produce.

BRIEF DESCRIPTION OF THE DRAWINGS

FIG. 1 is a perspective view of a prior art fluorescent lamp;

FIG. 2 is a perspective exploded view of the lamp of FIG. 1;

FIG. 3 is a perspective view of a fluorescent lamp according to the present invention;

FIG. 4 is a perspective exploded view of the lamp of FIG. 3;

DETAILED DESCRIPTION OF THE INVENTION

Figure 5:
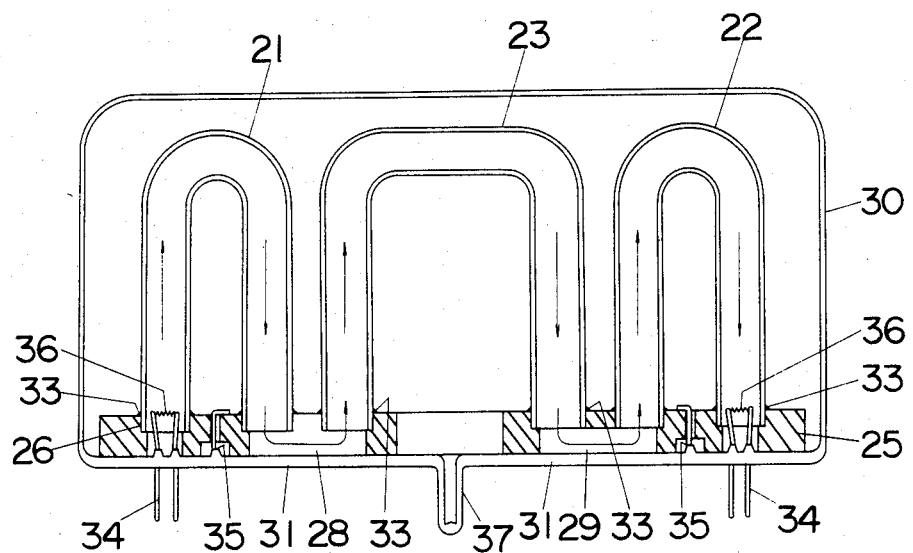
FIG. 5 is a developed view of the lamp of FIG. 3 partially in section to show the discharge path thereof.

This invention relates to a high-density fluorescent lamp of compact size, which houses therein inner tubes in a discharge space formed of an outer bulb and a stem so that the inner tubes serve as the discharge path.

Referring to FIGS. 1 and 2, this kind of conventional fluorescent lamp is shown. FIG. 1 is an external perspective view thereof and FIG. 2 is a perspective exploded view of the same, in which reference numeral 1 designates U-like-shaped inner tubes each coated at the inner surface with a fluorescent material and fixed thereon by heating. Each inner tube 1 is fitted at both openings 8 thereof onto annular projecting walls 5 formed at a disc-like-shaped metallic holder 4 and fixed thereto through a support rod 7, a holding metal fitting 8 and a nut 9. Reference numeral 10 designates a glass stem called the button stem, into which lead wires are enclosed and filament electrodes 12 are attached to the tips of lead wires respectively, 13 designates an exhaust pipe integral with the stem 10, and 14 designates a ceramic spacer comprising a smaller diameter portion 14a of diameter to be fitted into a bore 6 at the annular projecting wall 5 and a larger diameter portion having a shoulder 14b to abut against the lower surface of metallic holder 4 and having at the center a through bore 16 into which the electrode 12 is insertable. After the smaller diameter portion 14a at the spacer 14 is inserted into the bore 6 at the metallic holder 4, each electrode 12 at the spacer 14 is inserted through the bore 16 at the spacer 14, and thereafter an outer bulb 17 and stem 10 are sealed and air exhaustion and gas charging are carried out through the exhaust pipe 13 as the same as the conventional lamp. In addition, in FIG. 1, reference numeral 18 designates a lighting unit housing therein a ballast or the like, and 19 designates a screw base screwable with a lamp socket.

Next, this invention will be detailed in accordance with a first embodiment shown in FIGS. 3 through 5, in which reference numerals 21, 22 and 23 designate U-like-shaped inner tubes each coated at the inner surface with a fluorescent material and burnt, and 25 designates a spacer provided with six inner tube insertion bores 27a through 27f having spot facing 26 for positioning and fixing the U-like-shaped inner tubes 21, 22 and 23 respectively. The adjacent insertion bores 27a and 27b communicate with each other through a connecting bore 28 open upwardly and downwardly and another adjacent insertion bores 27c and 27d communicate through a connecting groove 29 open downwardly only, the connecting bore 28 serving to communicate the space formed by an outer bulb 30 and a button stem or base member 31 to be discussed below with the discharge space of the respective inner tubes 21, 22 and 23. Also, reference numeral 32 designates grooves for inserting spacer fixing wires for fixing the spacer 25 onto the button stem.

Now, the U-shaped inner tubes 21, 22 and 23 are fitted at both open ends thereof into the spot facings 26 on the inner tube insertion bores 27 provided in the spacer 25, and thereafter fixed in an airtight manner to the spacer 25 by use of an adhesive 33, such as a heat-resistant inorganic adhesive of heat-curing type or a glass frit. Such airtight fixing, however, is not indispensable when a gap between the inner wall of inner tube and the spot facing 26 of the spacer 25, is reduced. In this embodiment, the inner tubes 21, 22 and 23 are formed of lead glass and the spacer 25 is formed of forsterite ($2MgO.SiO_2$), and an inorganic adhesive 33 is preferably SUMISERAMU S-301 (commercial name), by which applicants have obtained a good result. The above materials of course are exemplary only and not limited.

The button stem or base member 31 encloses four lead wires 34 and four spacer fixing wires 35, the lead wires 34 each carrying an electrode 36. In addition, reference numeral 37 designates an exhaust pipe.

Next, the spacer 25, to which the U-shaped inner tubes 21, 22 and 23 are secured in an airtight manner, is placed on the button stem 31 and positioned so that both the electrodes 36 and spacer fixing wires 35 on button stem 31 correspond to the inner tube insertion bores 27a through 27f in the spacer 25, the spacer 25 being fixed to the button stem 31 by bending the fixing wires 35 radially inwardly of space or 25 on the upper surface thereof. Such process forms one discharge path comprising the electrodes 34 and U shaped inner tubes 21, 22 and 23, connected in series, in which the fixing of spacer 25 to button stem 31, while reducing the gap therebetween, is accomplished.

After the open end of outer bulb 30 and the outer periphery of button stem 31 are airtight-sealed, the usual electrode material activation treatment, air exhaustion and electric-discharging-gas charging, are carried out through the exhaust pipe 37, thereby completing a lamp unit. In addition, reference numeral 38 designates a lighting unit, and 39 designates a base constructed as the same as conventional. Alternatively, each U shaped inner tube 21, 22 or 23 may be made of ultraviolet transmission glass and coated on the inner surface with a fluorescent material 24. The tubes may also have other shapes, -like, V-like or spiral-shaped.

Figure 6:
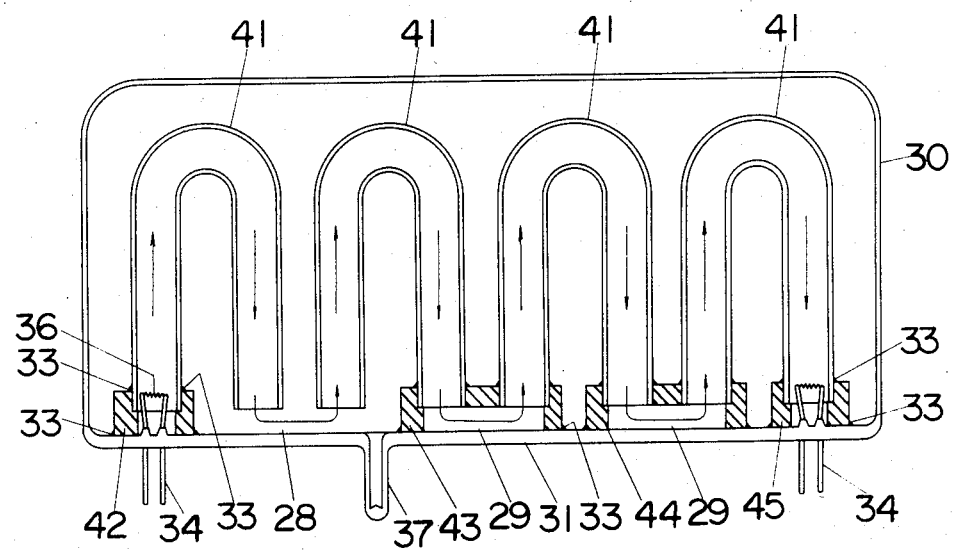
FIG. 6 is a developed view, similar to FIG. 5, showing a modified embodiment of the invention; and, FIG. 7 is a developed view similar to FIG. 5, showing a second modified embodiment of the invention.

Next, FIG. 6 shows a modified embodiment, a second embodiment, of the invention, which comprises four U shaped inner tubes 41 each of about identical size and form. The inner tubes 41, as shown, are connected in series through, for example, separate spacers 42, 43, 44 and 45 so that only one connecting portion between the inner tubes 41 is open with respect to the space formed by the outer bulb 30 and button stem 31 in order to make the discharge space in common. In addition, in this second embodiment, other components are the same as those in the first embodiment, which are represented by the same reference numerals thus further explanation is omitted herewith.

Upon lighting the fluorescent lamps in the above first and second embodiments, the discharge path is formed as shown by the arrows in FIGS. 5 and 6. The lamp in the first embodiment, of outer diameter of 60 mm and of overall length of 120 mm including lighting unit 35 and base 39 and of 16 W power, has obtained a luminous flux of 980 lm. In a second embodiment, the lamp of 60 mm outer diameter, 105 mm overall length, and 18 W power, has obtained a luminous flux of 1160 lm.

Another modified embodiment of the invention is shown in FIG. 7, which is a developed sectional view along the discharge path. This embodiment, in which two inner tubes 210 and 220 are fixed within an outer bulb 300 through a spacer 250, has a connecting groove 290, thereby expecting the effect as the same as the foresaid first and second embodiments.

As seen from the above, the fluorescent lamp of the invention forms a discharge path in such a manner that, within the airtight space formed of the outer bulb and button stem, two or more bent inner tubes for defining the discharge path are connected in series through a connecting groove bored in the spacer, that space being indispensable in itself even in the conventional apparatus. Hence, a discharge path longer than the conventional one can be formed, thereby providing a fluorescent lamp of compact size and of high efficiency in comparison with the conventional one.

Furthermore, in this invention, the inner tubes are mounted to a stem through the spacer and fixed at a predetermined position within the outer bulb, so that a bulky support means, such as the support rod or holding metal fitting, in the conventional appliance can be omitted, whereby a fluorescent lamp having the above characteristic and also of compact size and of high quality can be provided.

We claim:

1. A high density fluorescent lamp comprising:
   a plurality of bent tubes having fluorescent material on their inner surfaces and open ends secured to a spacer so that said tubes are compactly arranged;
   an outer bulb surrounding said plurality of bent tubes and having an open end;
   said spacer being disc-shaped of a diameter less than the diameter of the open end of the outer bulb and positioned in said open end;
   said spacer having a thickness sufficient to define a plurality of passages integrally formed within said spacer and interconnecting the interiors of said bent tubes with each other to define a discharge path for a discharge gas through said tubes and said passages so that only a single part is used both to support the bent tubes and to define said passages; two electrodes in said discharge path; and
   a base member having an inner surface in contact with one surface of said spacer and having a diamater greater than the spacer and presenting a peripheral edge for attachment to the open end of the outer bulb to close said outer bulb to define an airtight space enclosing said bent tubes and said spacer and an opening in said spacer in communication with said passages and the airtight space in said outer bulb.

2. The lamp of claim 1 having at least three bent tubes.

3. The lamp of claim 1 in which said spacer has at least one groove for securing it to said base member.

4. The lamp of claim 1 in which said tubes and said passages are connected in series to define a single discharge path common to all said bent tubes.

5. The lamp of claim 1 in which said base member includes an outlet means for evacuation of said outer bulb.

6. A high density fluorescent lamp comprising:
   at least three bent tubes having fluorescent material on their inner surfaces and open ends secured to a spacer so that said tubes are compactly arranged;
   an outer bulb surrounding said plurality of bent tubes and having an open end;
   said spacer being disc-shaped of a diameter less than the diameter of the open end of the outer bulb and positioned in said open end;
   said spacer having a thickness sufficient to define at least six passages integrally formed within said spacer and interconnecting the interiors of said bent tubes with each other to define a discharge path for a discharge gas through said tubes and said passages so that only a single part is used both to support the bent tubes and to define said passages;
   said passage connecting upwardly to the interior of the outer bulb and downwardly to connect with the interior of the bent tubes with two of the passages opening upwardly and downwardly, two of the passages having a filament electrode and not in communication with other passages and two of the passages open only downwardly; and
   a base member having an inner surface in contact with one surface of said spacer and having a diamater greater than the spacer and presenting a peripheral edge for attachment to the open end of the outer bulb to close said outer bulb to define an airtight space enclosing said bent tubes and said spacer and an opening in said spacer in communication with said passages and the airtight space in said outer bulb.

* * * * *